US009728817B2

(12) United States Patent
Comello et al.

(10) Patent No.: US 9,728,817 B2
(45) Date of Patent: Aug. 8, 2017

(54) APPARATUS AND METHOD FOR IN-LINE CHARGING OF A PIPELINE TOOL

(71) Applicant: InvoDane Engineering Ltd., Toronto (CA)

(72) Inventors: Corry Comello, Scarborough (CA); Paul Laursen, Toronto (CA); Daryl Speers, Ajax (CA); Peter Taylor, Brooklin (CA)

(73) Assignee: InvoDane Engineering Ltd., Toronto, Ontario (CA)

( * ) Notice: Subject to any disclaimer, the term of this patent is extended or adjusted under 35 U.S.C. 154(b) by 763 days.

(21) Appl. No.: 13/829,247

(22) Filed: Mar. 14, 2013

(65) Prior Publication Data
US 2014/0266009 A1    Sep. 18, 2014

(51) Int. Cl.
| H02J 7/00 | (2006.01) |
| H01M 10/42 | (2006.01) |
| F16L 55/26 | (2006.01) |
| H01M 2/10 | (2006.01) |

(52) U.S. Cl.
CPC ......... *H01M 10/425* (2013.01); *F16L 55/26* (2013.01); *H01M 2/1077* (2013.01)

(58) Field of Classification Search
CPC .................................................. F16L 2101/30
USPC ..................................... 15/104.062; 320/107
See application file for complete search history.

(56) References Cited

U.S. PATENT DOCUMENTS

| 5,450,765 A | 9/1995 | Stover |
| 6,107,795 A | 8/2000 | Smart |
| 6,917,176 B2 * | 7/2005 | Schempf ............... G01M 3/005 |
| | | 318/568.11 |
| 7,100,463 B2 | 9/2006 | Boudreaux |

(Continued)

FOREIGN PATENT DOCUMENTS

| EP | 2366866 | 9/2011 |
| JP | H06261423 | 9/1994 |

(Continued)

OTHER PUBLICATIONS

Scott, David. "Flat Electric Motor Operates through Solid Barriers". Popular Science, Aug. 1976, p. 61.*

(Continued)

*Primary Examiner* — Robert Grant
*Assistant Examiner* — Harry O'Neill-Becerril
(74) *Attorney, Agent, or Firm* — Hodgson Russ LLP

(57) ABSTRACT

An apparatus for electrically charging a rechargeable power source of a pipeline tool while the tool is located within a pipeline comprises a power module including a charging power source, an insertion module including an insertion mechanism having a charging plug for mating with a charging socket of the pipeline tool and a drive assembly operable to extend and retract the charging plug, and a power line electrically connecting the charging power source to the charging plug. The charging power source, power line, and charging plug may be enclosed by a pressure barrier and brought into pressure equalization with the pipeline, wherein the power line does not cross the barrier. The charging power source may include batteries or a generator. If a generator is employed and a pressure barrier must be maintained, a magnetic coupling may be used to transmit kinetic energy across the barrier for input to the generator.

39 Claims, 16 Drawing Sheets

(56) References Cited

U.S. PATENT DOCUMENTS

| | | | |
|---|---|---|---|
| 9,145,761 B2* | 9/2015 | Hallundbæk | E21B 41/04 |
| 2002/0011124 A1 | 1/2002 | Phipps | |
| 2008/0070499 A1 | 3/2008 | Wilhelm | |
| 2008/0284174 A1 | 11/2008 | Nagler | |
| 2010/0152524 A1* | 6/2010 | Sentmanat | A61M 1/101 |
| | | | 600/16 |
| 2010/0263881 A1* | 10/2010 | Fritz | A62C 35/68 |
| | | | 169/13 |
| 2012/0091709 A1* | 4/2012 | Hobdy | F03B 13/20 |
| | | | 290/42 |
| 2013/0076902 A1* | 3/2013 | Gao | B25J 9/042 |
| | | | 348/148 |
| 2014/0187107 A1* | 7/2014 | Gemin | B63H 21/22 |
| | | | 440/3 |
| 2015/0267686 A1* | 9/2015 | Kjær | F03D 7/0224 |
| | | | 290/44 |

FOREIGN PATENT DOCUMENTS

| | | |
|---|---|---|
| TW | I377042 | 11/2012 |
| WO | 02070943 | 9/2002 |
| WO | 03034158 | 4/2003 |

OTHER PUBLICATIONS

David Scott, "Flat Electric Motor Operates through Solid Barriers", Popular Science, Aug. 1976, p. 61.*
WIPO, International Preliminary Report on Patentability, issued Sep. 15, 2015 in International Application No. PCT/CA2014/000205.
Scott, David. Flat Electric Motor Operates through Solid Barriers. Popular Science, Aug. 1976, p. 61. Aug. 1, 1976.

* cited by examiner

APPARATUS AND METHOD FOR IN-LINE CHARGING OF A PIPELINE TOOL

FIELD OF THE INVENTION

The present invention relates generally to pipeline tools intended to travel within pipelines for inspection, cleaning, and/or maintenance of the pipeline, and more particularly to an apparatus and method for charging a rechargeable power source of a pipeline tool while the system remains within the pipeline. As used herein, the term "pipeline tool" encompasses both pressure propelled and self-propelled robots and in-line inspection systems. By way of non-limiting example, the term "pipeline tool" includes in-line inspection or "ILI" systems. The term "pipeline tool" is not limited to the examples given, and is meant to include any system inserted in a pipeline that has a rechargeable power source.

BACKGROUND OF THE INVENTION

Pipeline tools, such as that disclosed in U.S. Pat. No. 6,917,176, operate using an on-board power source that supplies power to subsystems used by the tool. For example, power may be needed for propelling the pipeline tool through a pipeline, operating measurement and sensor devices such as light sources and cameras, and energizing control and communications circuitry. Pipeline tools commonly include a rechargeable power source and a charging contact for on-board energy needs. The entire aforementioned U.S. Pat. No. 6,917,176 is incorporated herein by reference for its disclosure of a pipeline tool having a rechargeable power source and a charging contact. Pipeline tools may be used in both pressurized and non-pressurized pipelines used to transport a variety of fluids in both liquid and gas forms.

Charging a rechargeable power source of a pipeline tool used within a pressurized pipeline presents a challenge because opening the pipeline will require depressurization of the pipeline and the downtime, cost, and environmental concerns associated therewith. Charging a rechargeable power source of a pipeline tool used within a pressurized natural gas pipeline presents a special challenge because safety regulations prohibit the flow of power across a pressure barrier associated with the natural gas pipeline. One approach for dealing with these challenges is to return the pipeline tool to its original deployment location and remove the pipeline tool from within the pressurized pipeline for recharging. After the tool's power source has been recharged, it is again inserted into the pipeline and deployed for further service. This approach is time consuming because the pipeline tool may need to retrace its path in the pipeline. Energy spent returning the pipeline tool to the deployment location is not available to run the intended service functions of the tool. This approach is also limiting in terms of the range of pipeline distance coverable from a given deployment location, and thus requires creation of a relatively large number of deployment locations along the pipeline.

Apart from the special challenge posed by natural gas pipelines, there is a need for a charging power source that is easily portable over large pipeline distances. The need for portability combines with the special regulatory challenge described above when dealing with natural gas pipelines, so that providing the charging power source within the pressure barrier must also be achieved. Batteries are one option for use as a charging power source, however they are costly and have a limited charge life.

SUMMARY OF THE INVENTION

The present invention provides an apparatus for electrically charging a rechargeable power source of a pipeline tool while the pipeline tool is located within a pipeline. The apparatus generally comprises a power module including a charging power source, an insertion module including an insertion mechanism having a charging plug for mating with a charging socket of the pipeline tool and a drive assembly operable to extend and retract the charging plug, and a power line electrically connecting the charging power source to the charging plug. In an embodiment of the invention suitable for circumstances in which the pipeline contains a pressurized fluid, such as a pressurized liquid or natural gas, the charging power source, the power line, and the charging plug are enclosed by a pressure barrier. The insertion module may be releasably mountable on a fitting in the pipeline and have a drive assembly connected to the charging plug, wherein the drive assembly is operable to move the charging plug into the pipeline through the fitting.

In one embodiment, the power module includes a battery pack to provide the charging power source. In another embodiment, the power module includes a generator for converting kinetic energy into electrical power. In circumstances where a pressure barrier must be maintained, the generator may be driven by a magnetic coupling transmitting kinetic energy across the barrier. A shaft or transmission link could also be used to transmit kinetic energy across the barrier, provided the area in the barrier through which the shaft or link passes is properly sealed.

The present invention also encompasses a method of electrically charging a rechargeable power source of a pipeline tool while the system is located within a pipeline. The method involves providing a portable charging apparatus comprising a power module including a charging power source, an insertion module configured to connect to the pipeline and having an extendable and retractable charging plug, and a power line electrically connecting the charging power source to the charging plug. The insertion module is connected to the pipeline through a fitting in the pipeline, and a charging socket of the pipeline tool is aligned with the charging plug. The charging plug is then extended into contact with the charging socket to establish a charging circuit including the charging power source and the rechargeable power source. Finally, the charging circuit is activated to charge the rechargeable power source with power supplied by the charging power source.

BRIEF DESCRIPTION OF THE DRAWING VIEWS

The invention will be described in detail below with reference to the accompanying drawing figures, in which.

DETAILED DESCRIPTION OF THE INVENTION

Figure 1:
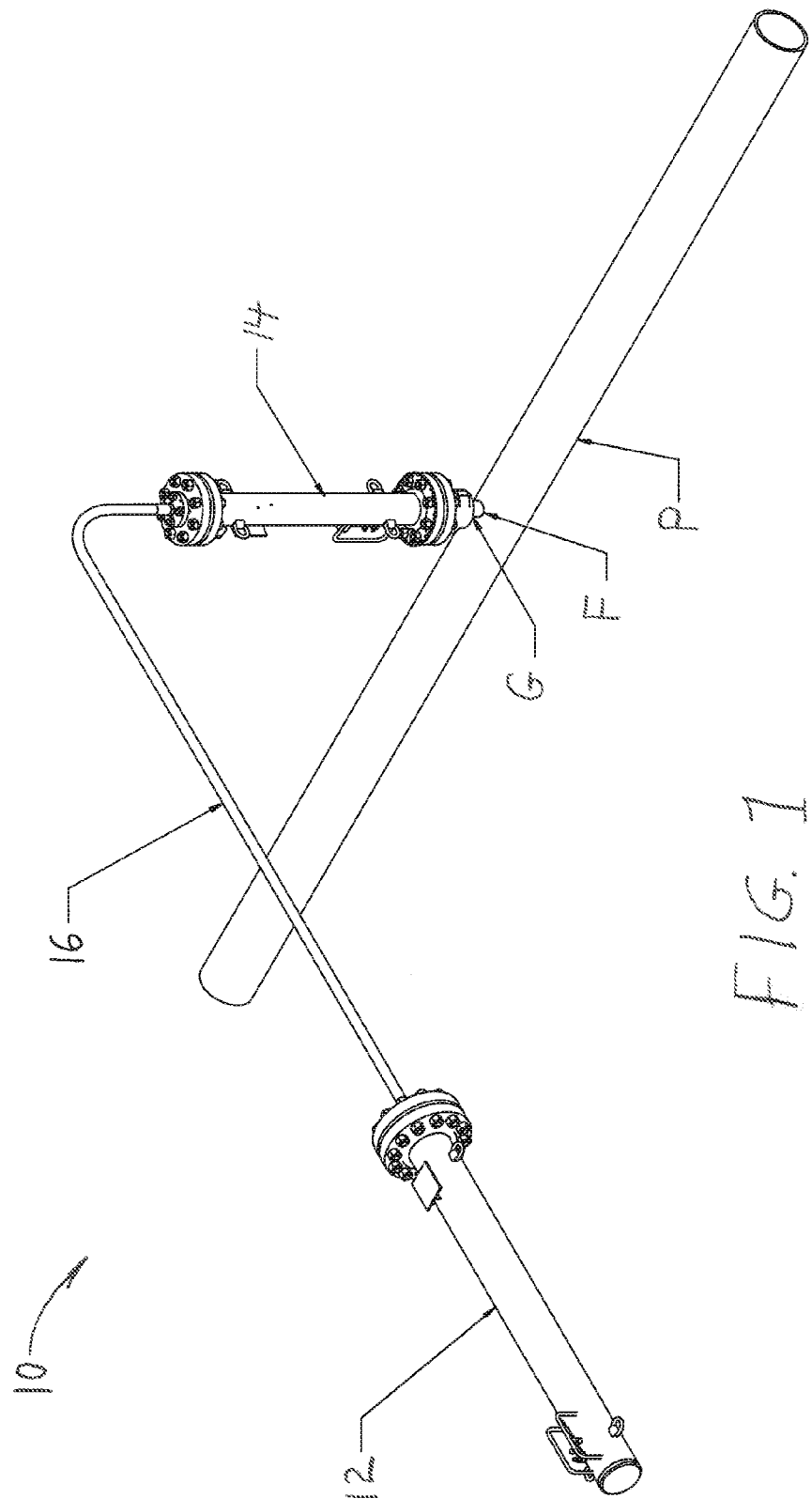
FIG. 1 is a perspective view of an in-line charging assembly formed in accordance with a first embodiment of the present invention, wherein the in-line charging assembly is shown connected to a pipeline.
Figure 2:
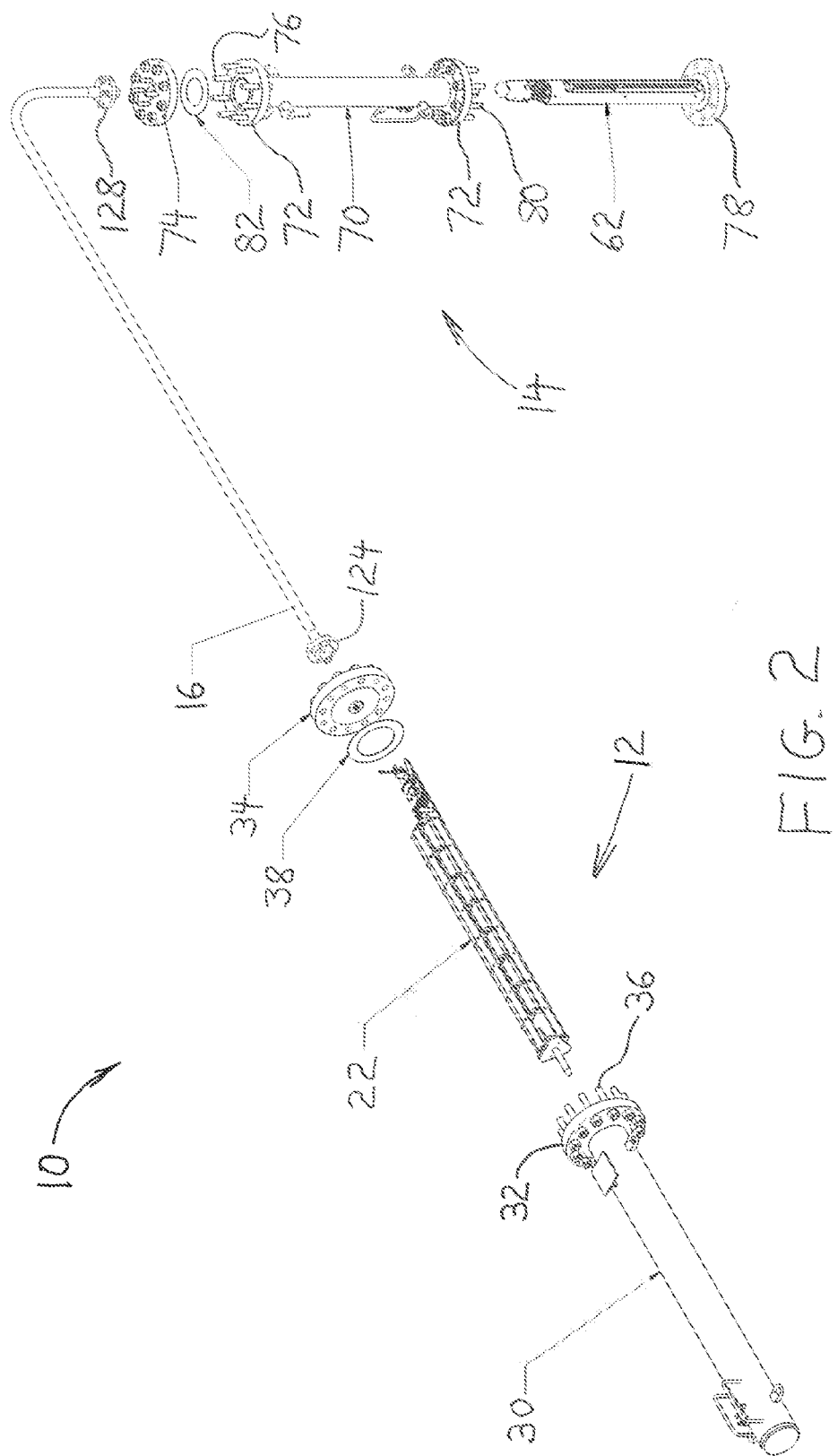
FIG. 2 is an exploded perspective view of the in-line charging assembly shown in FIG. 1.

FIGS. 1 and 2 show an in-line charging assembly 10 formed in accordance with a first embodiment of the present invention. In-line charging assembly 10 is shown connected to a pipeline P at a fitting F having a gate valve G. Charging assembly 10 generally comprises a power module 12, an insertion module 14 configured for connection to fitting F, and a pressure hose 16 connecting the power module with the insertion module.

Figure 3:
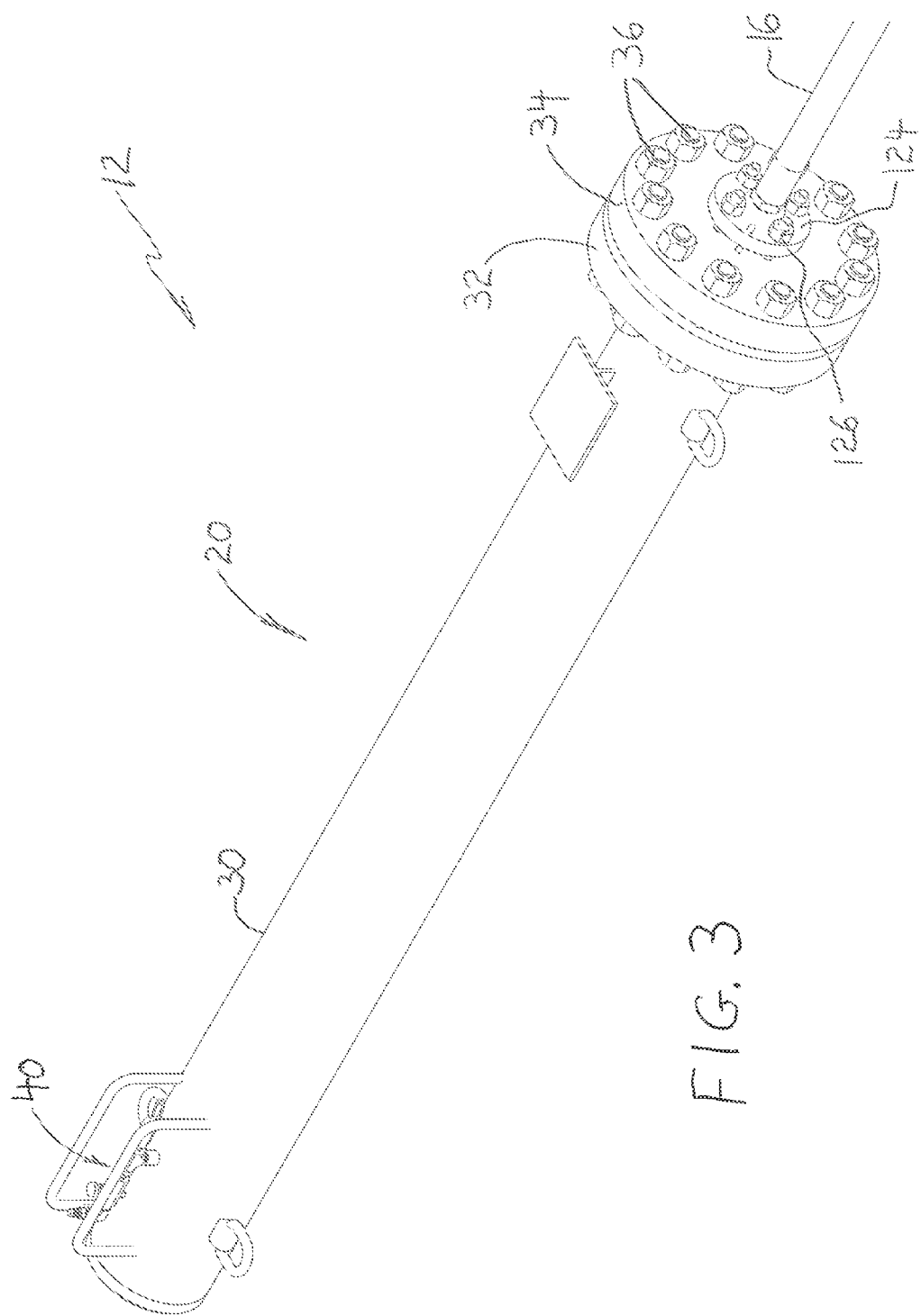
FIG. 3 is a perspective view of a power module of the in-line charging assembly of the first embodiment.
Figure 4:
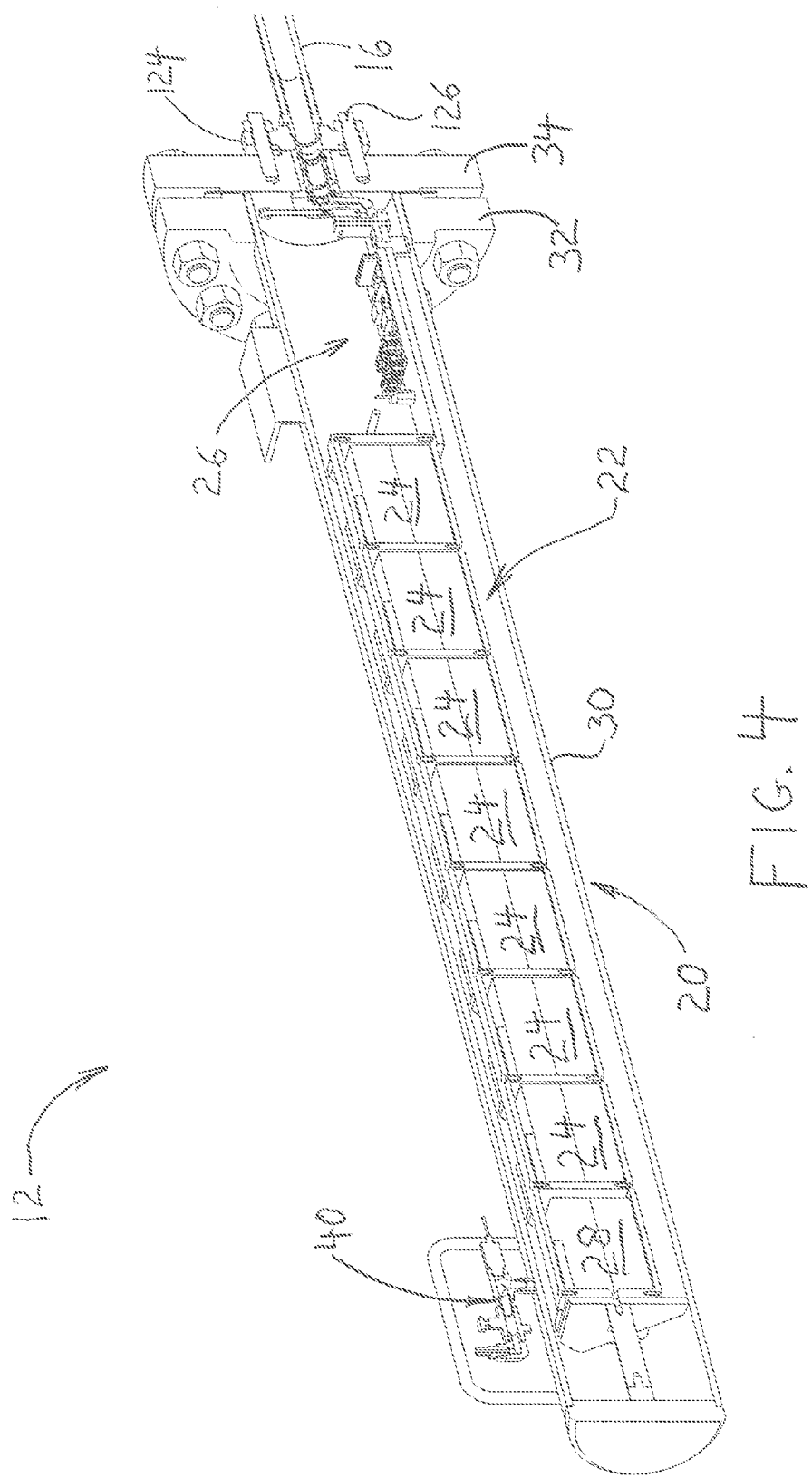
FIG. 4 is a sectional view of the power module shown in FIG. 3.
Figure 5:
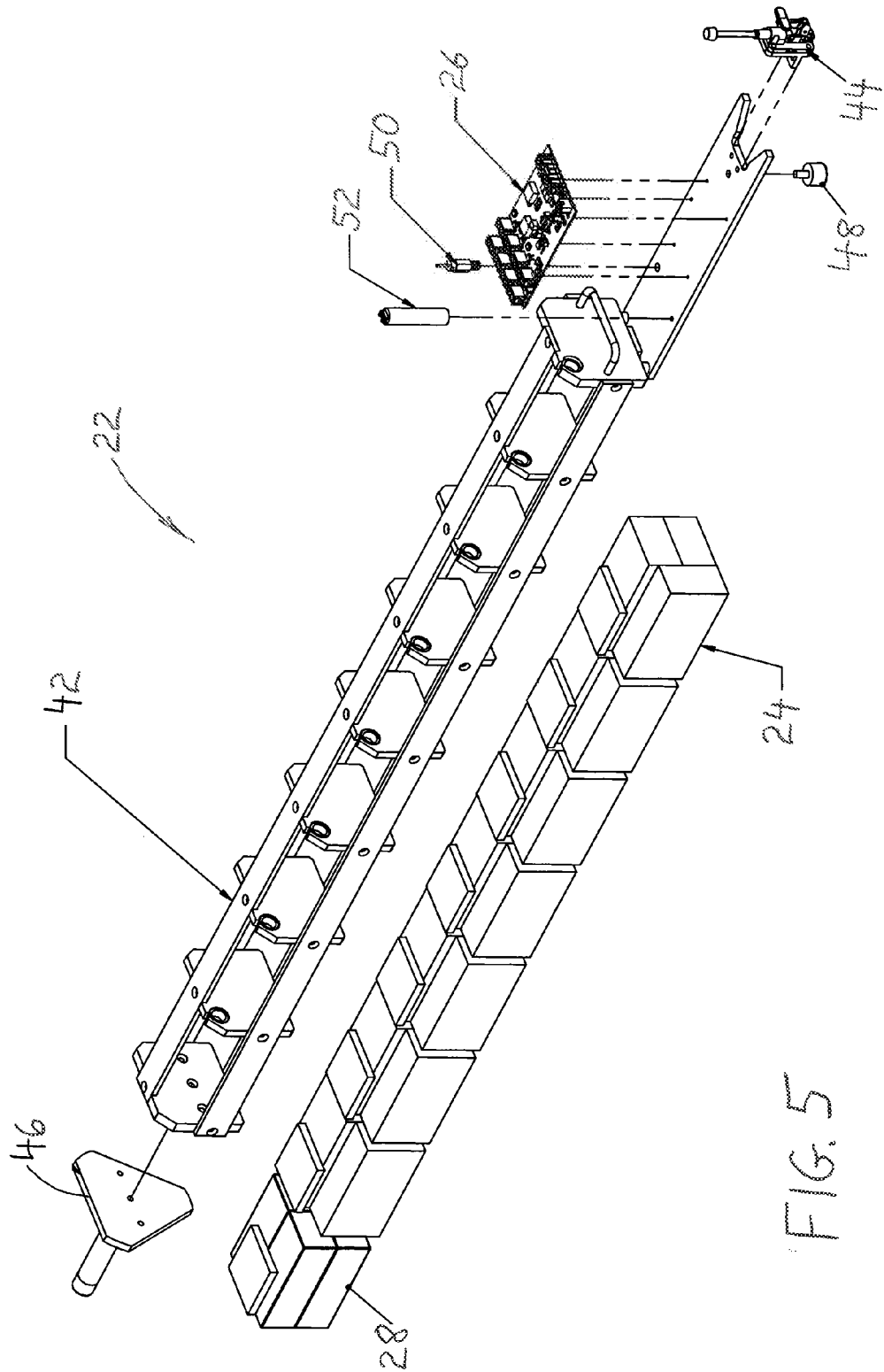
FIG. 5 is an exploded perspective view showing internal components of the power module of the first embodiment.
Figure 6:
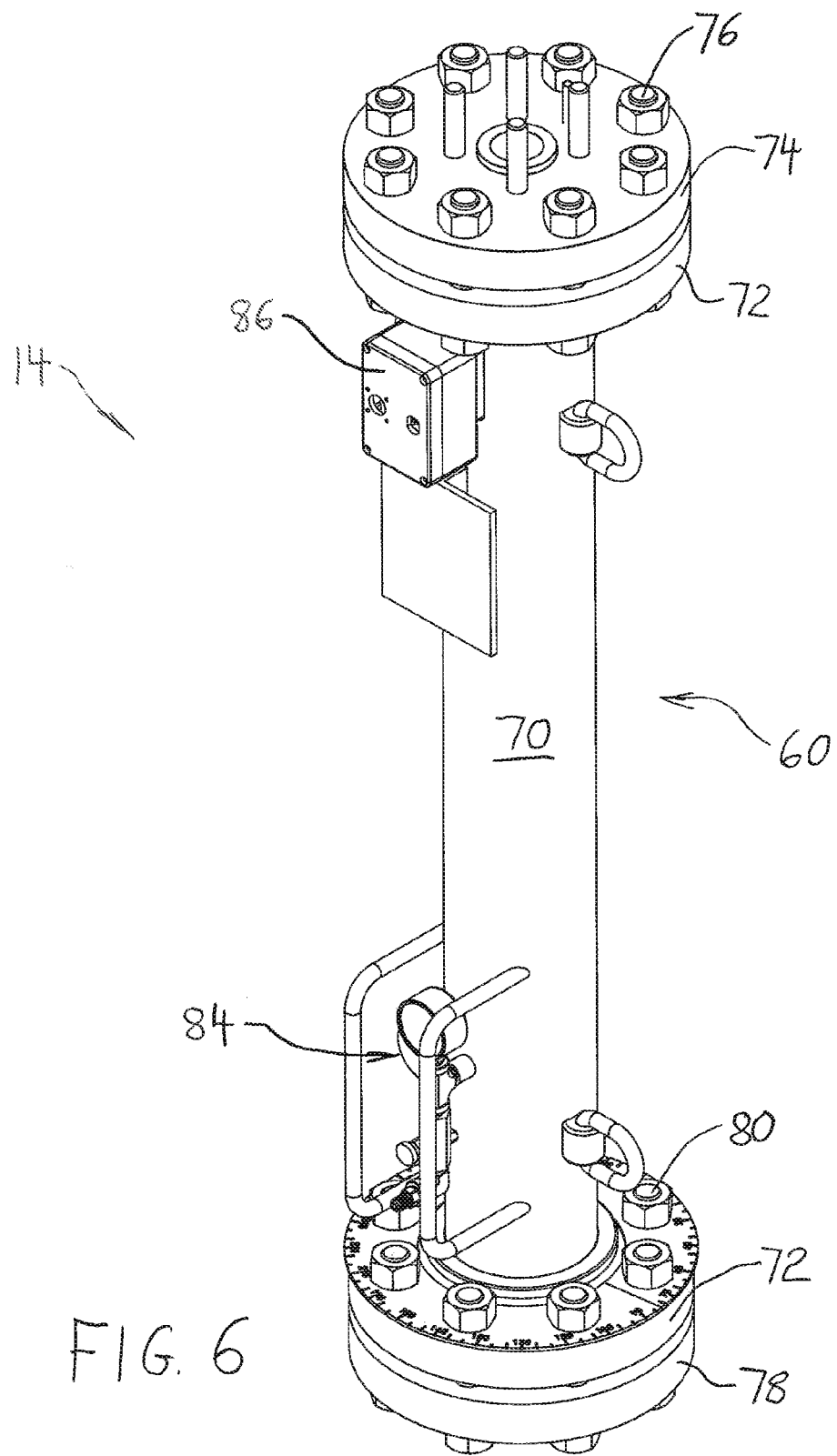
FIG. 6 is a perspective view of an insertion module of the in-line charging assembly.
Figure 7:
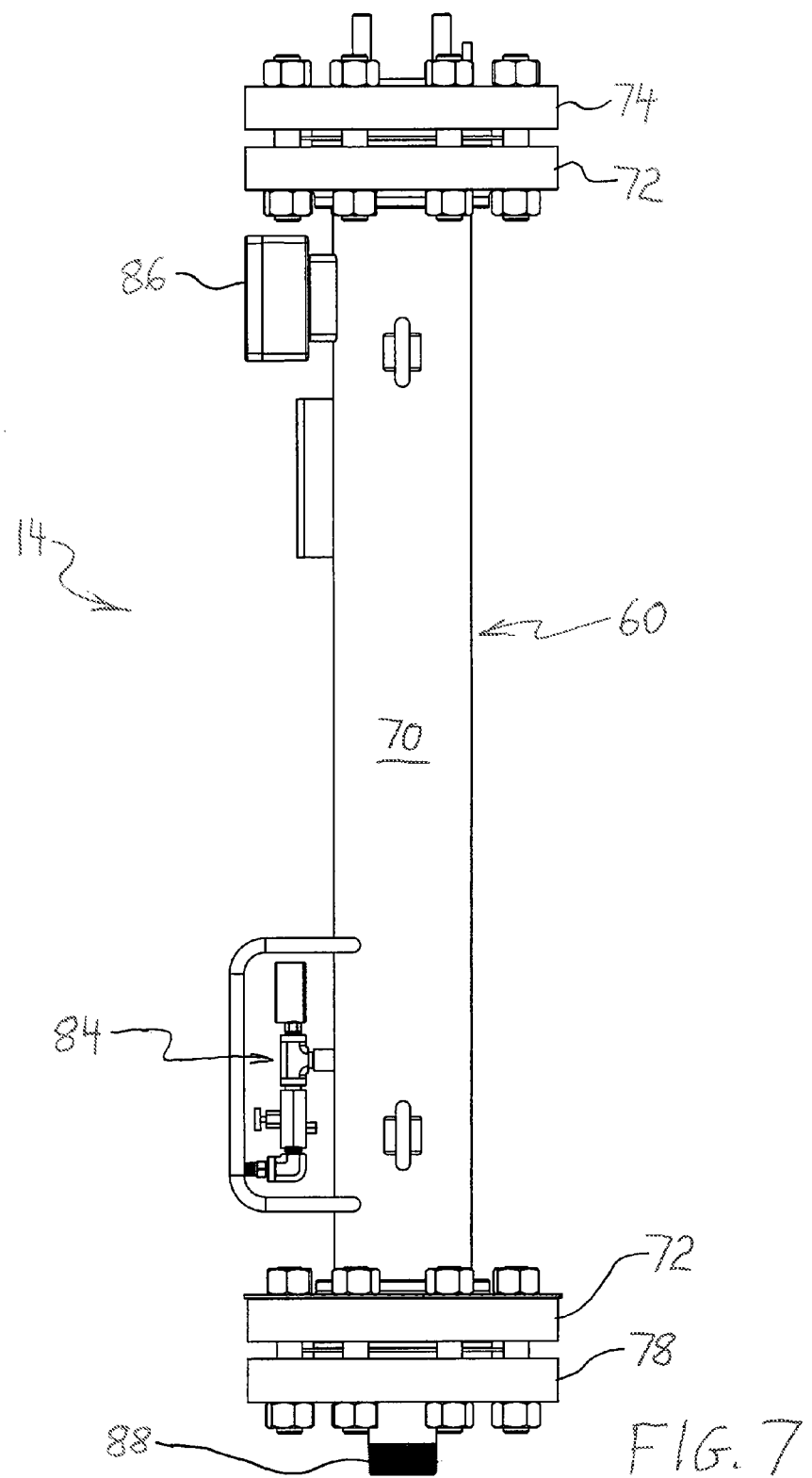
FIG. 7 is an elevational view of the insertion module shown in FIG. 6.
Figure 8:
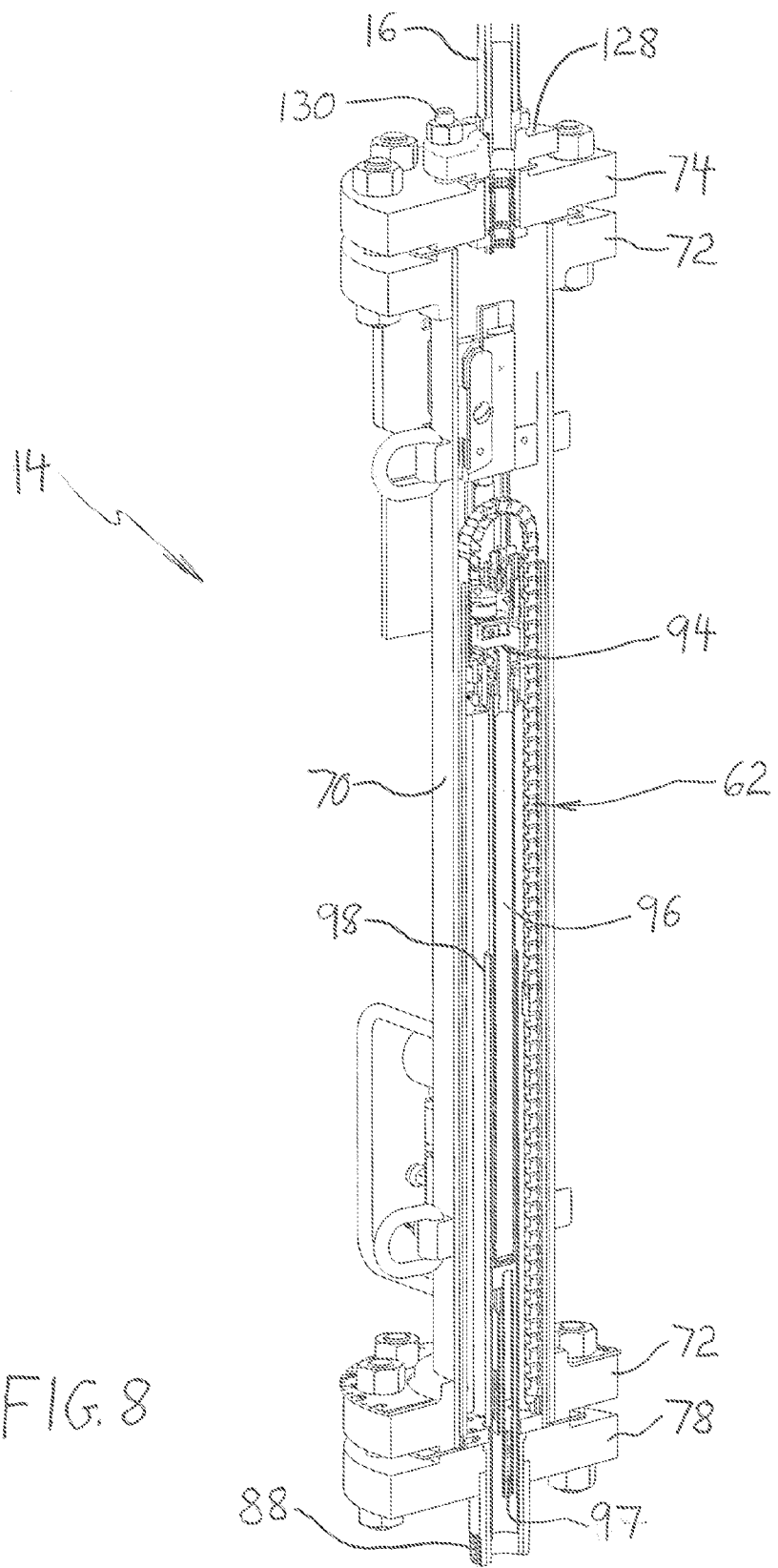
FIG. 8 is a sectional view of the insertion module.
Figure 9:
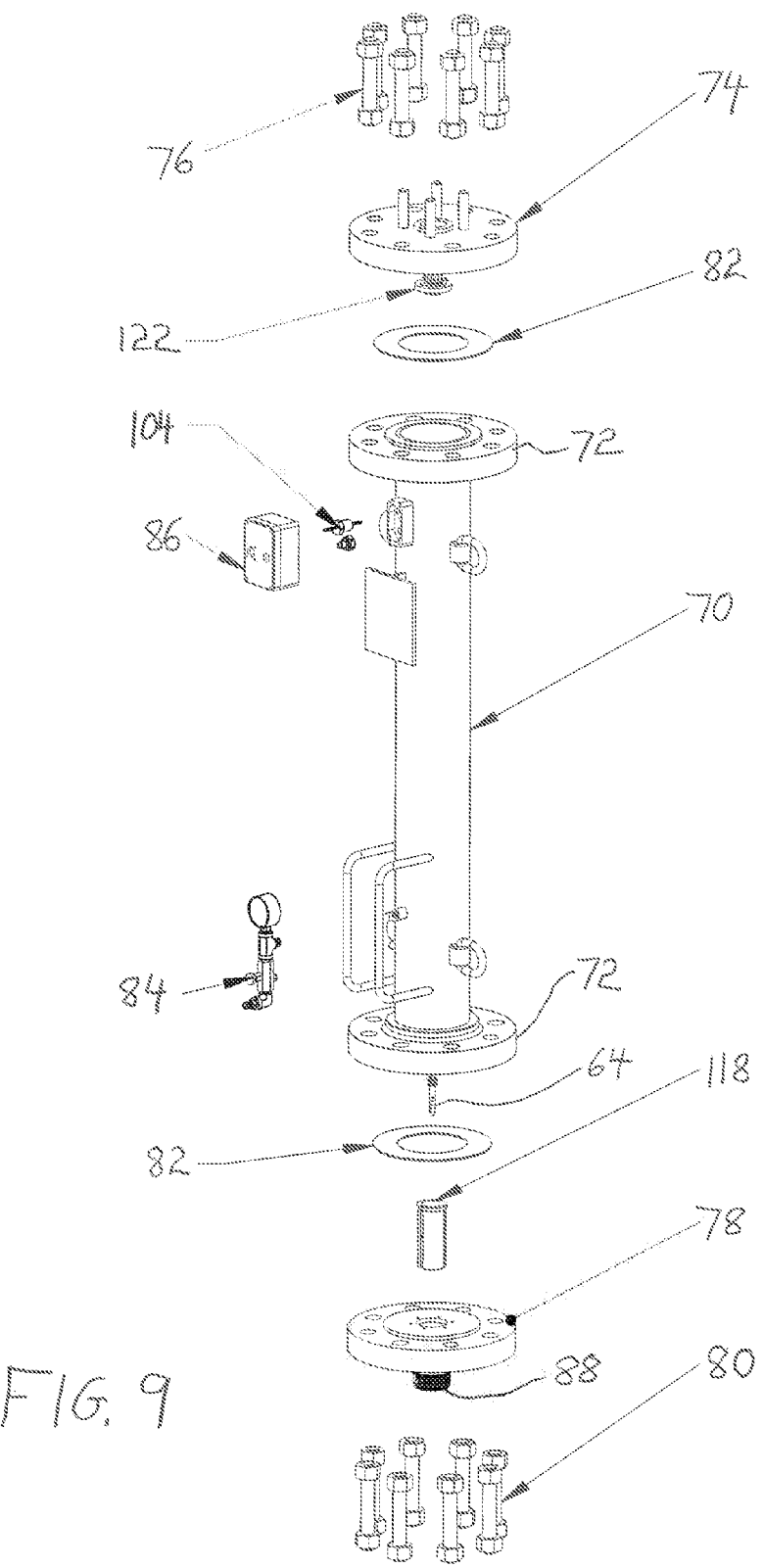
FIG. 9 is an exploded view of a pressure vessel of the insertion module.
Figure 10:
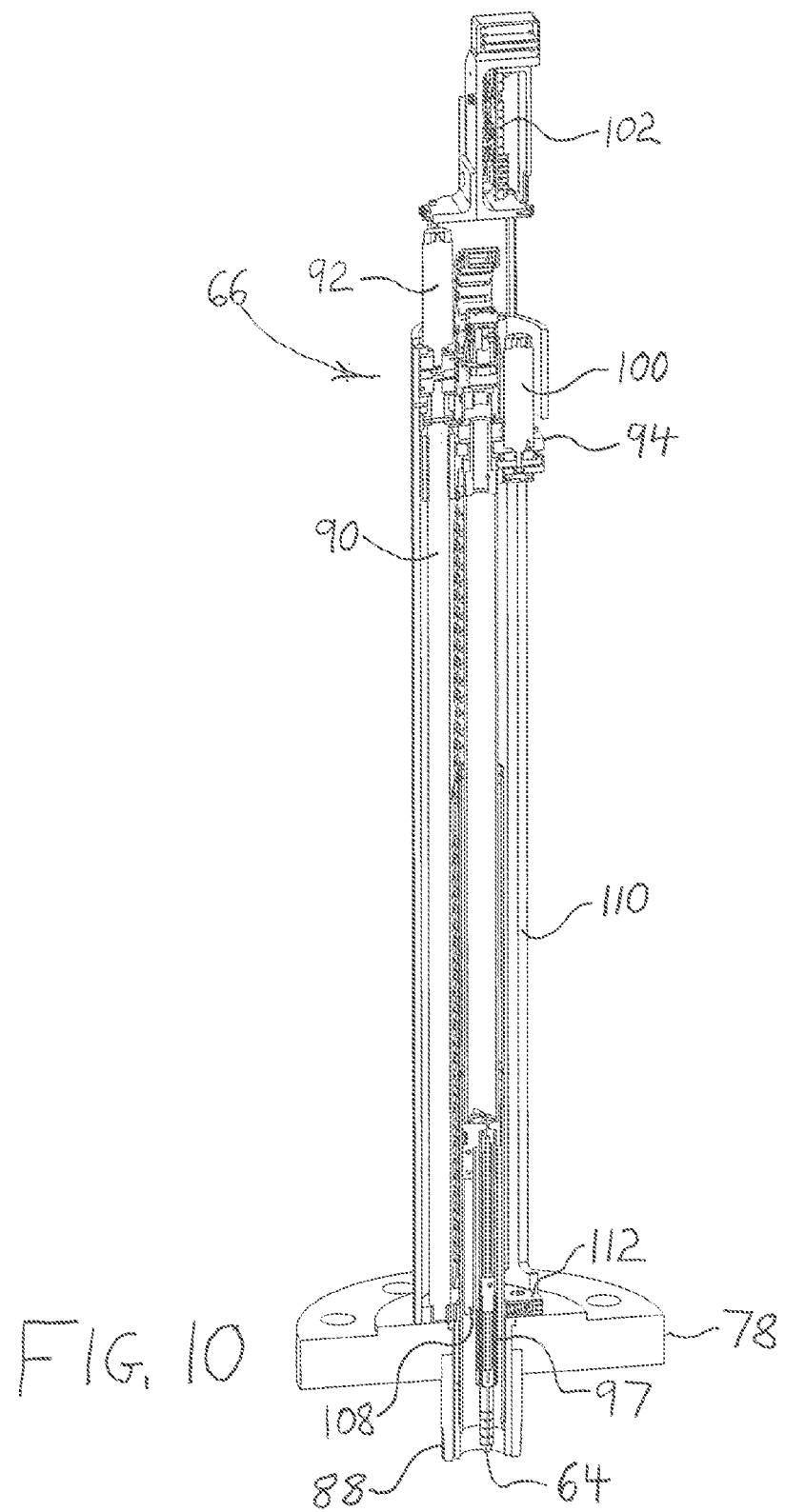
FIG. 10 is a sectional view showing a drive assembly of the insertion module.
Figure 11:
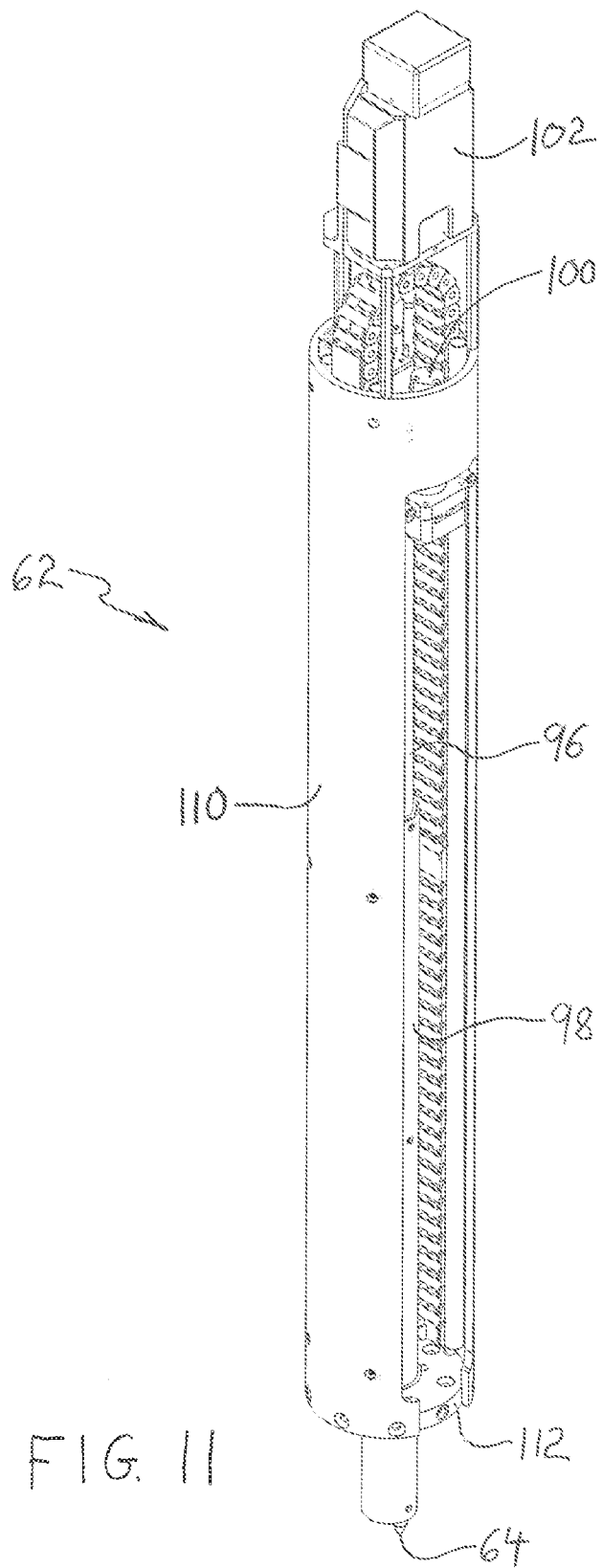
FIG. 11 is a perspective view of the insertion module drive assembly.
Figure 12:
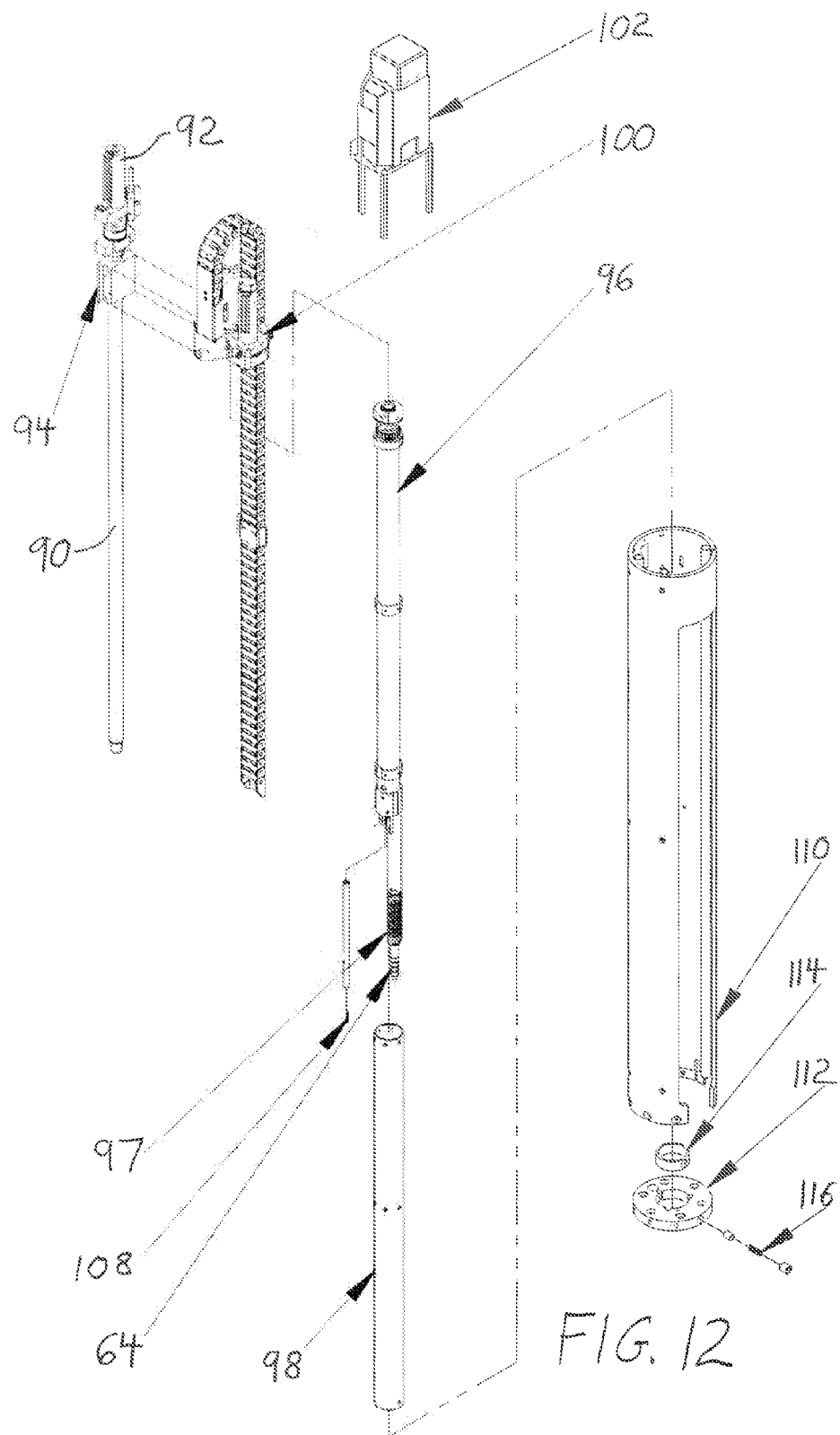
FIG. 12 is an exploded perspective view of the insertion module drive assembly.
Figure 13:
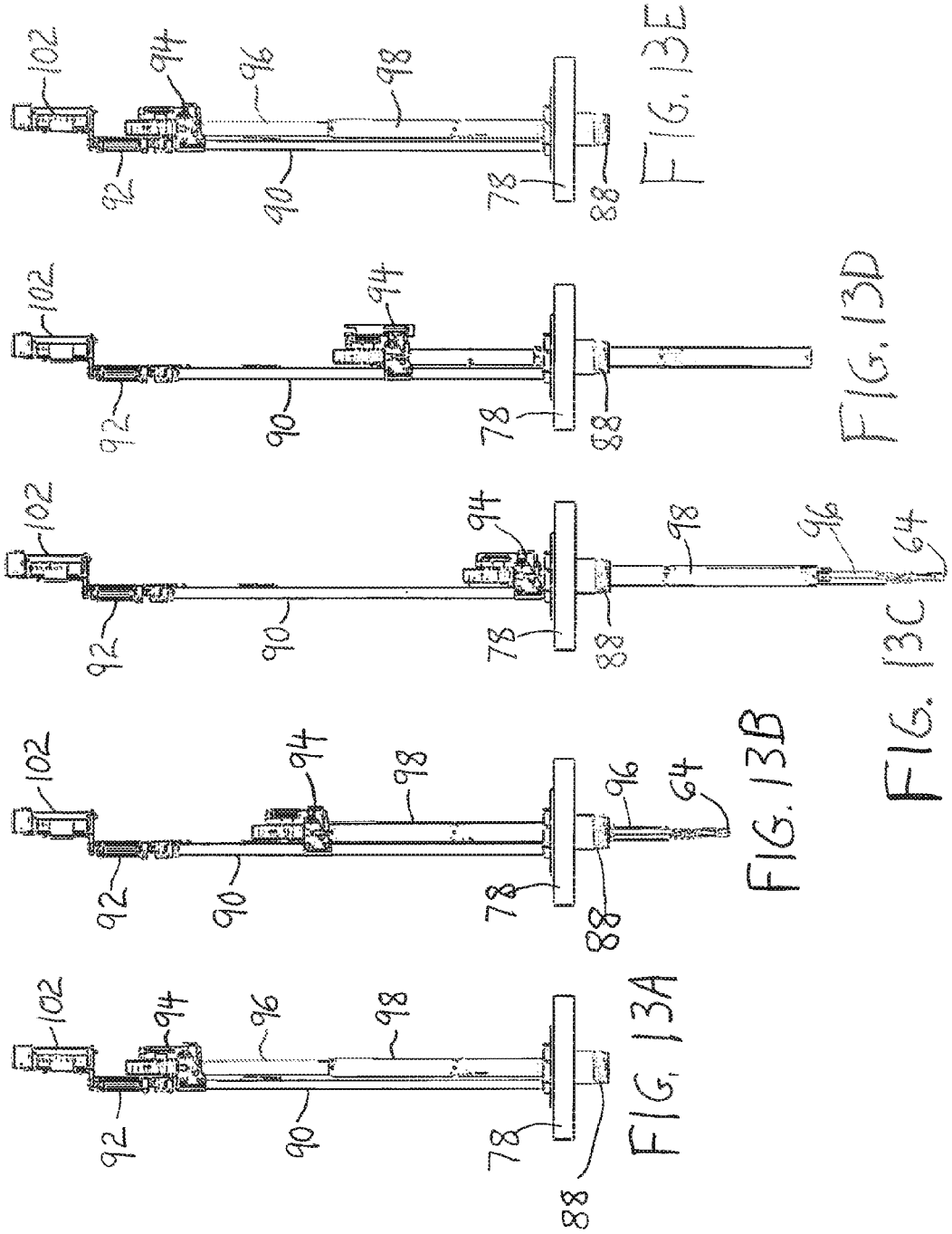
FIGS. 13A through 13E are a series of perspective views illustrating operation of the insertion module drive assembly.

Reference is also made now to FIGS. 3-5 for description of power module 12 of the first embodiment. Power module 12 includes a power module pressure vessel 20 receiving a battery pack 22. The battery pack 22 has a plurality of charging batteries 24 connected in series to provide a charging power source for charging a rechargeable power source of a pipeline tool T located within pipeline P. The battery pack also has a DC power supply circuit 26 connected to the charging batteries 24. Power module 12 of the first embodiment further includes a control battery 28 connected to power supply circuit 26 for energizing the power supply circuit.

In the depicted embodiment, power module pressure vessel 20 includes a pressure tube 30 having an attachment flange 32 adjacent an axial end of the pressure tube 30. Power module pressure vessel 20 also includes an end flange 34 attachable to flange 32 of pressure tube 30 by a plurality of threaded fasteners 36. A pressure sealing ring 38 may be situated between flanges 32 and 34. Pressure tube 30 may include a valve and pressure gauge 40 for monitoring internal pressure.

Battery pack 22 is best seen in the exploded view of FIG. 5. Battery pack 22 includes a battery holder frame 42 configured to hold charging batteries 24 and control battery 28. Battery holder frame 42 may be releasably secured within the power module pressure vessel 20 by a locking clamp 44, a brace member 46, and one or more feet 48 engaging internal walls of pressure tube 30. Power supply circuit 26 may be part of a circuit board attachable to battery holder frame 42. A pressure switch 50 may be associated with power supply circuit 26. A cable strain relief 52 may also be provided on battery holder frame 42. Charging batteries 24 serving as the charging power source may be chosen based on the recharging requirements of the pipeline tool to supply a required voltage. Likewise, control battery 28 may be chosen to supply a voltage suitable for operating power supply circuit 26. By way of non-limiting example, charging batteries 24 may be embodies a series of seven eight-cell battery units providing 34 Volts, and control battery 28 may be a single six-cell battery unit providing 24 Volts.

Insertion module 14 will now be described with reference to FIGS. 6-13. Insertion module 14 includes an insertion module pressure vessel 60 receiving an insertion mechanism identified generally by reference numeral 62. The insertion mechanism 62 has a charging plug 64 for mating with a charging socket S of the pipeline tool (see FIG. 14) and a drive assembly 66 operable to extend and retract the charging plug 64 relative to insertion module pressure vessel 60. As used herein, "plug" and "socket" are not intended to have the limited meaning of male and female mating contacts, respectively. Rather, "plug" and "socket" are used in the general sense of two contacts for making an electrical connection, and should be construed that way.

Insertion module pressure vessel 60 includes an insertion module pressure tube 70 having attachment flanges 72 adjacent top and bottom ends thereof. Insertion module pressure vessel 60 also includes a top end flange 74 attachable to top attachment flange 72 of pressure tube 70 by a plurality of threaded fasteners 76, and a bottom end flange 78 attachable to bottom attachment flange 72 of the pressure tube by a plurality of threaded fasteners 80. Pressure sealing rings 82 may be situated between each attachment flange 72 and its associated end flange 74 or 78. Pressure tube 70 may include a valve and pressure gauge 84 for monitoring internal pressure. A connection box 86 may be provided on pressure tube 70 for locating one or more connectors enabling connection of data cable(s) to the insertion mechanism. Bottom end flange 78 has a threaded hollow stem 88 for mating with fitting F in the pipeline, whereby insertion module pressure vessel 60 is releasably mountable on the pipeline fitting in pressure-sealed fashion. For example, fitting F may be an internally threaded O-ring fitting, such as a 2-inch diameter THREAD-O-RINGT™ fitting offered by T.D. Williamson, Inc.

As mentioned above, insertion mechanism 62 includes charging plug 64 and drive assembly 66. In the depicted embodiment, drive assembly 66 comprises a vertically-extending leadscrew 90, a first motor 92 arranged to rotate leadscrew 90 about its longitudinal axis, a carriage 94 mounted on leadscrew 90 for linear travel along the leadscrew when the leadscrew is rotated, and a main insertion tube 96 coupled to carriage 94 for linear travel with the carriage. Charging plug 64 is carried by main insertion tube 96, and may be mounted on the main insertion tube by a spring 97 to allow some axial deflection of the charging plug as it is aligned with and inserted into contact with charging socket S. The configuration and contact elements of charging plug 64 will depend on the configuration of charging socket S, and may include elements for transmitting data to and from the pipeline tool in addition to providing charging power to the pipeline tool. For example, the charging socket S may have connection contacts for a CAN bus or other data bus for communicating with an on-board controller of the pipeline tool, in which case the charging plug may incorporate corresponding connection contacts for data communication.

Drive assembly 66 further includes an outer tube 98 slidably receiving main insertion tube 96 in telescoping fashion. As best seen in FIGS. 13A-13E, drive assembly 66 has a fully refracted position (FIGS. 13A and 13E) wherein charging plug 64 is within outer tube 98 and the outer tube does not extend into the pipeline, a partially extended position (FIG. 13B) wherein charging plug 64 extends outside outer tube 98 into the pipeline and the outer tube does not extend into the pipeline, a fully extended position (FIG. 13C) wherein charging plug 64 extends outside outer tube 98 into the pipeline and the outer tube extends into the pipeline, and a partially refracted position (FIG. 13D) wherein charging plug 64 and outer tube 98 extend into the pipeline and charging plug 64 is retracted into outer tube 98. FIGS. 13A-13E illustrate an operation sequence of drive assembly 66 during extension and retraction of charging plug 64. Drive assembly begins in the fully retracted position illustrated in FIG. 13A. Drive assembly 66 adjusts to the partially extended position shown in FIG. 13B by operating first motor 92 to rotate leadscrew 90, causing carriage 94 and main insertion tube 96 to move downward until carriage 94 is flush with an upper end of outer tube 98. Continued operation of first motor 92 causes carriage 94 to move further downward such that outer tube 98 is moved with main insertion tube 96 to reach the drive assembly's fully extended position shown in FIG. 13C. Retraction is begun by commanding reverse rotation of leadscrew 90, whereby main insertion tube 96 is moved upward until charging plug 64 is withdrawn into outer tube 98 as shown in FIG. 13D. Continued operation of first motor 92 in the reverse direction causes main insertion tube 96 to engage outer tube 98 to bring the outer tube up with main insertion tube 96 and charging plug 64 into the fully retracted position.

Drive assembly 66 may include a second motor 100 arranged to rotate main insertion tube 96 about its longitudinal axis to enable angular alignment of charging plug 64 with charging socket S on the pipeline tool. Second motor 100 may be mounted on carriage 94 to directly drive rotation of main insertion tube 96.

Drive assembly 66 has a controller 102 for energizing first motor 92 and second motor 100. A connector 104 located in connection box 86 enables a user interface computer 106 (see FIG. 14) to be connected to controller 102 for data communication between user interface computer 106 and controller 102, whereby operation commands may be sent to controller 102 for operating drive assembly 66.

In the present embodiment, insertion module 14 is equipped with a sensor 108 carried by main insertion tube 96 and arranged adjacent to charging plug 64. Sensor 108 is intended to provide feedback assisting a user in aligning the pipeline tool's charging socket S with charging plug 64. Sensor 108 may take a variety of forms. For example, sensor 108 may be a camera, a proximity sensor, or a switch physically engaged by cooperating structure near the charging socket to indicate alignment. Sensor 108 may be connected to controller 102 to provide a sensing signal to the controller.

Components of drive assembly 66 may be contained by a cylindrical housing 110 having a removable mounting plate 112 fastened at its bottom end. Mounting plate 112 includes a central opening in which a bushing 114 is retained by radial friction screws 116. Bottom end flange 78 has a central passage extending through threaded stem 88, and an internal bushing 118 is received within the passage to axially align with bushing 114. Bushings 114 and 118 are sized for slidable receipt of outer tube 98 of drive assembly 66. Bottom end flange 78 may be fixed by fasteners (not shown) to mounting plate 112 to form a sub assembly.

Controller 102 may be supported by a platform 120 extending from an upper end of housing 110. An electrical connector 122 associated with controller 102 is situated in axial alignment with a passage through top end flange 74 and upper attachment flange 72.

Reference is again made to FIGS. 1 and 2 for description of pressure hose 16. Pressure hose 16 communicates between power module pressure vessel 20 and insertion module pressure vessel 60 to equalize pressure between the power module pressure vessel and the insertion module pressure vessel. Pressure hose 16 includes a first hose end flange 124 for attachment to end flange 34 of power module pressure vessel 20 by threaded fasteners 126. Likewise, pressure hose 16 includes a second hose end flange 128 for attachment to top end flange 74 of insertion module pressure vessel 60 by threaded fasteners 130. While pressure hose 16 is part of the first embodiment, an alternative configuration wherein the power module and the insertion module share a single pressure vessel is also possible, in which case pressure hose may be omitted.

Figure 14:
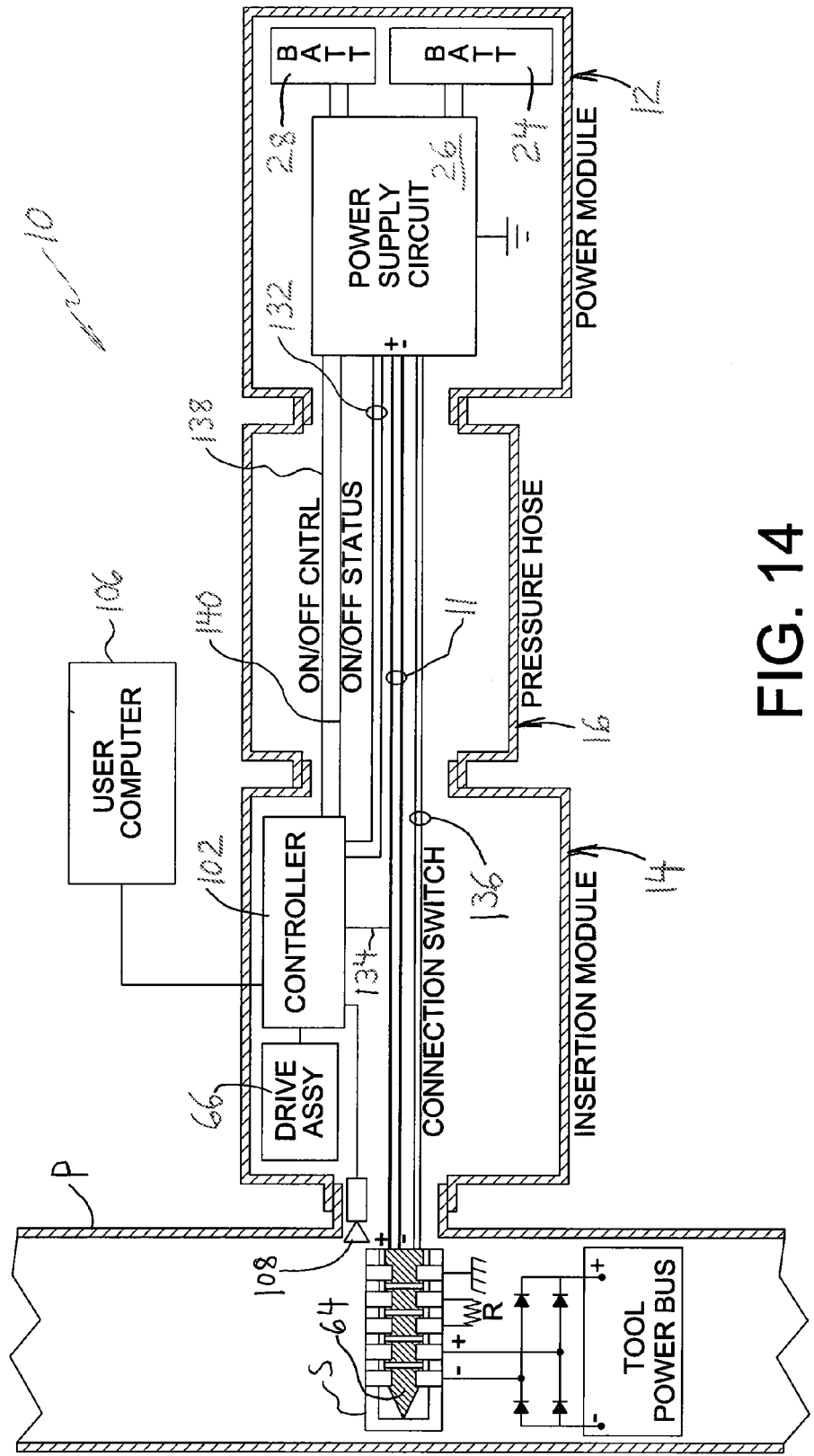
FIG. 14 is an electrical schematic diagram of the in-line charging assembly.

FIG. 14 schematically illustrates the electrical architecture of in-line charging assembly 10 of the first embodiment. A power line 11 electrically connects the charging power source (charging batteries 24) to charging plug 64 by way of power supply circuit 26. User interface computer 106 is connected to insertion module controller 102 so that control commands may be sent to controller 102. Power supply circuit 26 provides power over power line 132 for running controller 102. Controller 102 monitors voltage across power line 11 at line 134.

As will be understood, charging plug 64 is extended into mating contact with charging socket S of pipeline tool T to establish a charging circuit that includes the charging power source (batteries 24) and the rechargeable power source of the pipeline tool. A connector switch may be associated with the mating of charging plug 64 with charging socket S, whereby a signal is transmitted over line 136 to indicate whether a proper connection between the charging plug and charging socket has been made.

The charging circuit may be selectively switched on or off by an ON/OFF control signal sent from controller 102 to power supply circuit 26 over line 138, and an ON/OFF status signal is provided from power supply circuit 26 to controller 102 over line 140 to indicate the status of the charging circuit to controller 102. As an optional feature, pressure switch 50 may be connected to power supply circuit 26 and configured to prevent the charging circuit from being turned on unless the interior of power module pressure vessel 20 reaches a pressurized state in equilibrium with the pipeline pressure to close the pressure switch.

Power lines 11 and 132 are arranged to extend through pressure hose 16 from power module 12 to insertion module 14. Data lines 136, 138, and 140 may also be arranged to extend through pressure hose 16 from power module 12 to insertion module 14. Power line 11 may include a power cable contained in pressure hose 16, wherein an end of the power cable is electrically connected to power supply circuit 26 when first hose end flange 124 is attached to power module end flange 34.

Use of in-line charging assembly 10 of the first embodiment will now be described. In the following description, it is assumed the pipeline transports pressurized natural gas. Set-up involves mounting insertion module 14 on an existing fitting F in the pipeline located near the pipeline tool T. Mounting of insertion module 14 on fitting F is done while gate valve G is closed. Insertion module 14 is mounted on fitting F by threading stem 88 of bottom end flange 78 into threaded fitting F. Pressure hose 16 and power module 12 are connected to insertion module 14 by attaching second hose end flange 128 to top end flange 74 of insertion module 14, and attaching first hose end flange 124 to end flange 34 of power module 12. As will be understood, the assembly 10 now defines a pressure barrier enclosing the interior space with the insertion module pressure vessel 60, the pressure hose 16, and the power module pressure vessel 20. While the first embodiment described herein provides a pressure barrier, it will be understood that a pressure barrier may not be necessary for some types of pipelines, and that pressure vessels 20 and 60 may be omitted and a regular hose or cable bundle may be employed in place of pressure hose 16.

Set-up also involves connecting computer 106 to controller 102 by way of connector 104. Computer 106 may be a laptop computer or tablet running interface software allowing a user to send operating commands to controller 102. The same computer 106 or a different computer may be configured to communicate with pipeline tool T, whereby control commands may be sent to the pipeline tool.

Once the insertion module pressure barrier is established, gate valve G is opened and pressurized gas fills insertion module pressure vessel 60, pressure hose 16, and power module pressure vessel 20. Pressure gauges 40, 84 on pressure vessels 20, 60 may be checked to confirm pressure equalization with the pipeline interior.

Pipeline tool T is moved within the pipeline so as to align charging socket S of the pipeline tool with charging plug 64 in the insertion module. For example, if the pipeline tool is a self-propelled robot, then the robot is commanded to move until alignment is achieved. To assist in the alignment effort, a user may issue a command through computer 106 to cause drive assembly 66 to adjust to its partially extended position (FIG. 13B) so that sensor 108 may be used. Signal information from sensor 108 is communicated through controller 102 to user computer 106. For example, where sensor 108 is a camera, an image is displayed on computer 106 giving the user an indication of alignment status. If charging plug 64 requires angular alignment in addition to axial alignment, drive assembly 66 may be commanded to rotate main insertion tube 96 by operation of second motor 100 until angular alignment is achieved.

Once alignment is achieved, drive assembly 66 is commanded to adjust to its fully extended position (FIG. 13C) to extend charging plug 64 into contact with charging socket S, thereby establishing a charging circuit that includes the charging power source (batteries 24) and the rechargeable power source of the pipeline tool. As mentioned above, a connector switch may be associated with the mating of charging plug 64 with charging socket S such that a signal is transmitted over line 136 to confirm that a proper connection between charging plug 64 and charging socket S has been made.

The user may then issue a command to turn ON the charging circuit to charge the rechargeable power source with power supplied by the charging power source (batteries 24). Once recharging is complete, the charging circuit is turned OFF. Pressure switch 50 may be connected to power supply circuit 26 to act as a safety switch that will ensure the power supply circuit is OFF when charging assembly 10 is being removed from the pipeline.

To remove charging plug 64 from charging socket S, drive assembly 66 is commanded to adjust to its partially retracted position (FIG. 13D). Charging plug 64 is removed completely from the pipeline by commanding drive assembly to adjust to its fully retracted position (FIG. 13E). Once this has been done, gate valve G may be closed and insertion module 14 removed from fitting F.

Figure 15:
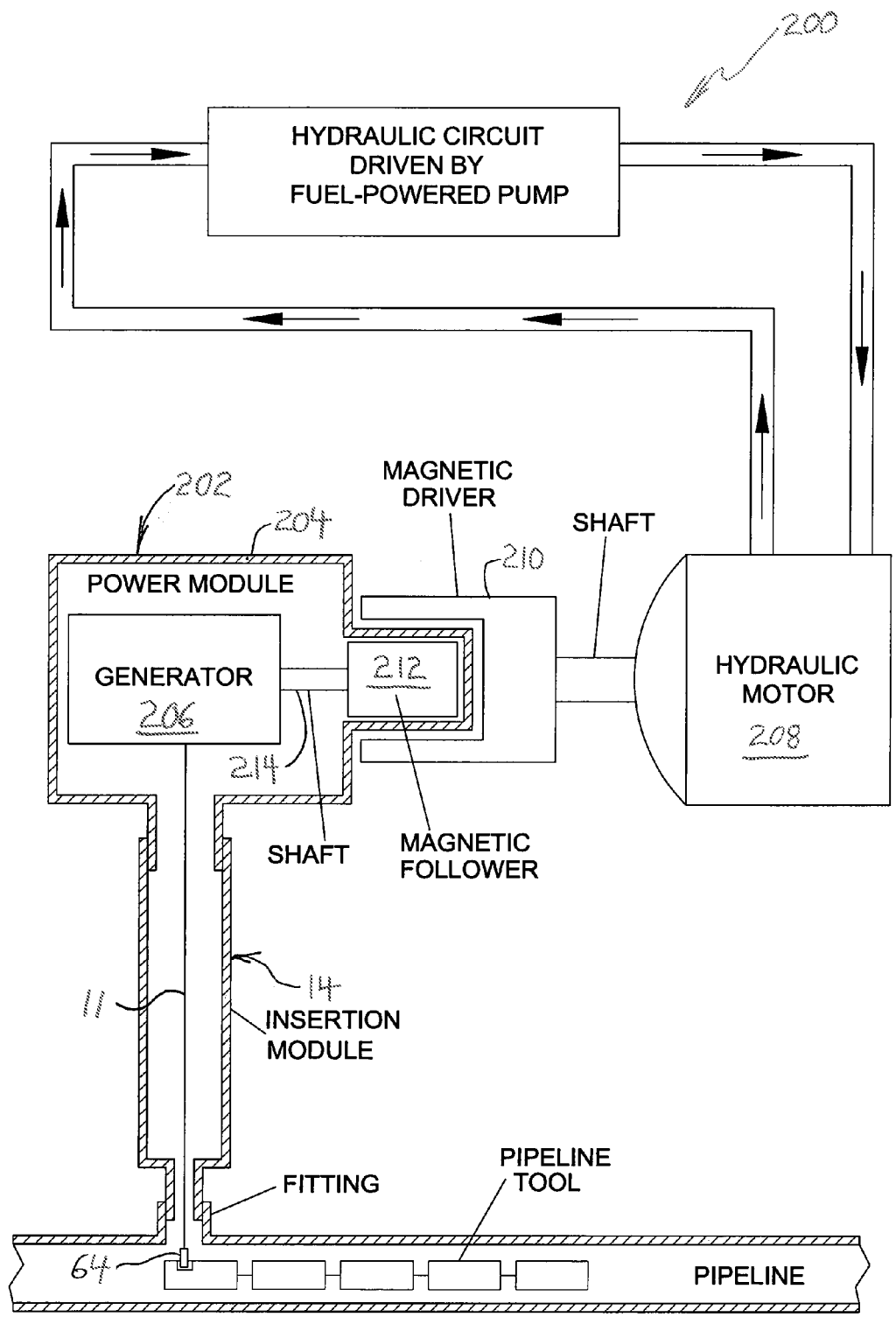
FIG. 15 is a schematic diagram of an in-line charging assembly formed in accordance with a second embodiment of the present invention wherein an alternate charging power source is utilized.
Figure 16:
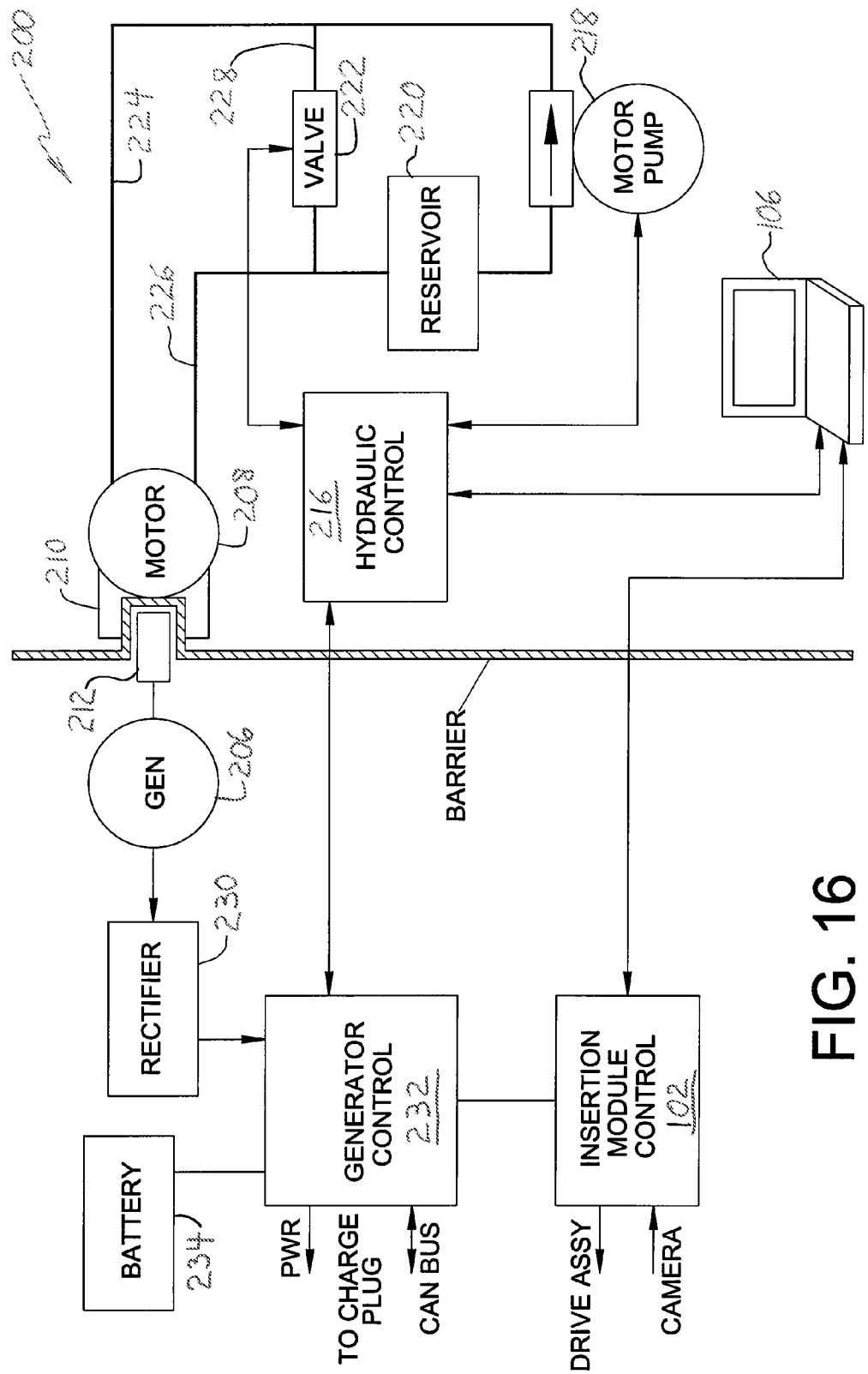
FIG. 16 is an electrical schematic diagram of the in-line charging assembly of the second embodiment.

FIGS. 15 and 16 show an in-line charging assembly 200 formed in accordance with a second embodiment of the present invention. In-line charging assembly 200 is similar to charging assembly 10 of the first embodiment in that it uses the insertion module 14 described above. However, charging assembly 200 of the second embodiment differs from charging assembly 10 of the first embodiment with respect to the power module. As will be described, charging assembly 200 uses a generator instead of batteries as a charging power source.

In-line charging assembly 200 is represented schematically in FIG. 15 as having a power module 202 and an insertion module 14. Power module 202 may include a power module pressure vessel 204 directly mountable on insertion module pressure vessel 60 (i.e. without pressure hose 16), or power module 202 and insertion module 14 may be embodied within a single shared pressure vessel. Of course, power module pressure vessel 204 may also be connected to insertion module pressure vessel 60 by a pressure hose as in the first embodiment.

Power module 202 includes an electric generator 206 located within pressure vessel 204. In order to provide kinetic energy as input to generator 206, a motor 208 is provided outside pressure vessel 204, and the motor is magnetically coupled to the generator. More specifically, motor 208 rotates a driver coupling 210 located outside pressure vessel 204, and a follower coupling 212 located inside the pressure vessel is magnetically coupled to driver coupling 210 such that rotation of the driver coupling causes rotation of the follower coupling. Follower coupling 212 is connected to an input shaft 214 of generator 206. Generator 206 converts kinetic energy associated with rotation of follower coupling 212 into electrical power.

While the type of motor used as driving motor 208 can vary based on power requirements, safety requirements, and other considerations, a hydraulic motor is preferred as motor 208 where the pipeline carries natural gas. FIG. 16 illustrates a hydraulic circuit configured to drive hydraulic motor 208 in a safe manner. The hydraulic circuit includes a hydraulic control unit 216, a pump 218 controlled by hydraulic control unit 216, a hydraulic fluid reservoir 220, and a valve 222 controlled by hydraulic control unit 216. Pump 218 is located along a hydraulic fluid supply line 224 running from reservoir 220 to motor 208. A hydraulic fluid return line 226 runs from motor 208 back to reservoir 220. Valve 222 is located along a bypass line 228 connecting return line 226 with supply line 224 at a location along the supply line downstream from pump 218.

Pump 218 may be a fuel-powered pump, for example a pump that runs on diesel fuel. Pump 218 may be located a safe working distance from the pressure vessel 204 and pipeline P that define the pressure barrier.

Hydraulic control unit 216 is connected to user interface computer 106 to allow data communication between hydraulic control unit 216 and computer 106. As may be understood, a user may use computer 106 to input control commands to hydraulic control unit 216 for controlling flow valve 222 and for controlling a throttle of pump 218, whereby hydraulic fluid flow may be regulated to control the torque supplied by hydraulic motor 208 to driver coupling 210. Thus, hydraulic control unit 216 acts as a motor control unit for motor 208. Hydraulic control unit 216 also receives feedback signals from sensors associated with valve 222 and pump 218. The power needs for operating hydraulic control unit 216 may be met by a power pack (not shown) associated with fuel-driven pump 218 for generating and storing electrical power.

Reservoir 220 supplies fluid to pump 218 and receives hydraulic fluid from motor 208. A heat exchanger (not shown) may be associated with reservoir 220 to remove excess heat from the fluid.

Inside pressure vessel 204, a rectifier 230 converts AC power from generator 206 into DC power. A generator control unit 232 receives DC power from rectifier 230 and includes a power supply circuit for controlling the supply of power to the pipeline tool through charging plug 64. Generator control unit 232 may also supply power to controller 102 of insertion module 14. Generator control unit 232 may be connected for data communication with the hydraulic control unit 216 to provide sensor feedback to hydraulic control unit 216. As a further option, generator control unit 232 may be in data communication with the pipeline tool through charging plug 64, for example by a CAN bus connection. When generator 206 is running, generator control unit 232 may receive operating power from rectifier 230. In order to supply power for operating generator control unit 232 and insertion module controller 102 when generator 206 is not running, an internal battery 234 may be connected to generator control unit 232.

In generator-based power module 202 of the second embodiment, magnetic coupling elements 210 and 212 provide a means for transmitting kinetic energy across the physical barrier, in this case a pressure barrier. The magnetic coupling arrangement is advantageous in this context because it avoids the need for a sealed passage for accommodating a shaft or other transmission member arranged to physically extend through the barrier without leakage of pressurized fluid. Nevertheless, a shaft or other transmission member or link extending through a passage in the barrier is an alternative means for transmitting kinetic energy across the barrier and is considered within the scope of the present invention. The type of drive motor 208 is subject to choice depending upon system requirements. For example, an electric motor or a fuel powered motor may be used instead of a hydraulic motor to provide kinetic energy. The location of the drive motor relative to the physical barrier is also subject to choice, and the drive motor need not be located near the barrier. For example, a long shaft or transmission assembly may be used and the drive motor may be located remotely from the barrier.

Embodiments of the present invention are described in detail herein, however those skilled in the art will realize that modifications may be made. Such modifications do not stray from the spirit and scope of the invention as defined by the appended claims.

What is claimed is:

1. An apparatus for electrically charging a rechargeable power source of a pipeline tool while the pipeline tool is located within a pipeline, the apparatus comprising:
   a power module including a charging power source;
   an insertion module including an insertion mechanism, the insertion mechanism having a charging plug for mating with a charging socket of the pipeline tool and a drive assembly operable to extend and retract the charging plug; and
   a power line electrically connecting the charging power source to the charging plug;
   wherein the charging power source, the power line, and the charging plug are enclosed by a pressure barrier;
   wherein the power module includes a power module pressure vessel receiving the charging power source, the insertion module includes an insertion module pressure vessel receiving the insertion mechanism, and the apparatus further comprises a pressure hose equalizing pressure between the power module pressure vessel and the insertion module pressure vessel, wherein the power line extends through the pressure hose.

2. The apparatus according to claim 1, wherein the charging power source, the power line, and the insertion mechanism are contained within a single pressure vessel.

3. The apparatus according to claim 1, wherein the power module includes a battery pack received in the power module pressure vessel, the battery pack having at least one charging battery as the charging power source and a power supply circuit connected the charging battery.

4. The apparatus according to claim 3, wherein the power module includes a control battery connected to the power supply circuit.

5. The apparatus according to claim 1, wherein the drive assembly is operable to extend and retract the charging plug relative to the insertion module pressure vessel.

6. The apparatus according to claim 3, wherein the battery pack has a pressure switch connected to the power supply circuit.

7. The apparatus according to claim 6, wherein the pressure switch is activated when the power module pressure vessel is pressurized.

8. The apparatus according to claim 3, wherein the power supply circuit receives remote commands.

9. The apparatus according to claim 3, wherein the battery pack includes a battery holder frame configured to hold the charging battery, and a locking clamp for releasably securing the battery holder frame within the power module pressure vessel.

10. The apparatus according to claim 3, wherein the power module pressure vessel has a power module pressure tube and a power module end flange attachable to the power module pressure tube, wherein the power module end flange is configured for secure mounting of an end of the pressure hose thereto.

11. The apparatus according to claim 10, wherein the power line includes a power cable contained in the pressure hose, and the pressure hose includes a hose end flange for attachment to the power module end flange, wherein the power cable is electrically connected to the power supply circuit when the hose end flange is attached to the power module end flange.

12. The apparatus according to claim 11, wherein the pressure hose further contains a data cable, wherein the data cable is electrically connected to the power supply circuit when the hose end flange is attached to the power module end flange.

13. The apparatus according to claim 1, wherein the power module includes a generator as the charging power source.

14. An apparatus for electrically charging a rechargeable power source of a pipeline tool while the pipeline tool is located within a pipeline, the apparatus comprising:
   a power module including a charging power source, wherein the power module includes a generator as the charging power source;
   an insertion module including an insertion mechanism, the insertion mechanism having a charging plug for mating with a charging socket of the pipeline tool and a drive assembly operable to extend and retract the charging plug;
   a power line electrically connecting the charging power source to the charging plug; and
   a drive motor for driving the generator, wherein the drive motor is not enclosed by the pressure barrier;

wherein the charging power source, the power line, and the charging plug are enclosed by a pressure barrier.

15. The apparatus according to claim 14, wherein the drive motor is magnetically coupled to the generator across the pressure barrier.

16. The apparatus according to claim 14, wherein the drive motor is a hydraulic motor.

17. The apparatus according to claim 14, wherein the power module includes a generator control unit enclosed by the pressure barrier, and the drive motor is connected to a motor control unit not enclosed by the pressure barrier.

18. The apparatus according to claim 14, wherein the generator control unit is in data communication with the motor control unit.

19. An apparatus for electrically charging a rechargeable power source of a pipeline tool while the pipeline tool is located within a pipeline, the apparatus comprising:
a portable charging power source; and
an insertion module releasably mountable on a fitting in the pipeline, the insertion module including a charging plug connected to the charging power source and a drive assembly connected to the charging plug;
wherein the drive assembly is operable to move the charging plug into the pipeline through the fitting;
wherein the drive assembly includes a leadscrew, a first motor arranged to rotate the leadscrew, a carriage mounted on the leadscrew for linear travel along the leadscrew when the leadscrew is rotated, and a main insertion tube coupled to the carriage for linear travel therewith, wherein the charging plug is carried by the main insertion tube.

20. The apparatus according to claim 19, wherein the drive assembly further includes an outer tube slidably receiving the main insertion tube, and the drive assembly has a retracted position wherein the charging plug is within the outer tube and the outer tube does not extend into the pipeline, a partially extended position wherein the charging plug extends outside the outer tube into the pipeline and the outer tube does not extend into the pipeline, and a fully extended position wherein the charging plug extends outside the outer tube into the pipeline and the outer tube extends into the pipeline.

21. The apparatus according to claim 19, wherein drive assembly includes a second motor arranged to rotate the main insertion tube.

22. The apparatus according to claim 19, wherein the drive assembly includes a controller for energizing the first motor, and the insertion module includes a first connector for connecting a computer to the controller.

23. The apparatus according to claim 19, wherein the insertion module further includes a sensor carried by the main insertion tube and arranged adjacent to the charging plug.

24. The apparatus according to claim 23, wherein the sensor is a camera.

25. The apparatus according to claim 23, wherein the sensor is a proximity sensor.

26. The apparatus according to claim 23, wherein the sensor is an engagement switch.

27. An apparatus for providing electrical power to a device inside a physical barrier, the apparatus comprising:
means for transmitting kinetic energy across the physical barrier;
a generator inside the barrier, the generator converting kinetic energy transmitted across the physical barrier into electrical power; and
a generator control unit receiving power generated by the generator;
wherein the physical barrier is a pressure barrier associated with a pipeline transporting pressurized fluid;
wherein the means for transmitting kinetic energy comprises:
a drive motor outside of the barrier;
a driver coupling outside of the barrier rotated by the drive motor; and
a follower coupling inside the barrier and magnetically linked to the driver coupling such that rotation of the driver coupling causes rotation of the follower coupling;
wherein the generator converts kinetic energy associated with rotation of the follower coupling into electrical power.

28. The apparatus according to claim 27, wherein the pressurized fluid is natural gas.

29. The apparatus according to claim 27, wherein the drive motor is a hydraulic motor.

30. The apparatus according to claim 29, further comprising a pump and a reservoir connected to form a hydraulic circuit with the hydraulic motor.

31. The apparatus according to claim 30, wherein the pump is a fuel-powered pump.

32. The apparatus according to claim 31, wherein the pump is locatable at a safe working distance from the physical barrier.

33. The apparatus according to claim 30, wherein the hydraulic circuit includes a flow valve for controlling flow of hydraulic fluid to the hydraulic motor.

34. The apparatus according to claim 33, further comprising a hydraulic control unit connected to the pump and the flow valve.

35. The apparatus according to claim 34, further comprising a rectifier connected between the generator and the generator control unit.

36. The apparatus according to claim 34, wherein the generator control unit includes a power supply circuit for supplying power to the device.

37. The apparatus according to claim 34, wherein the generator control unit is in data communication with the hydraulic control unit.

38. The apparatus according to claim 37, further comprising a user interface computer in data communication with the hydraulic control unit.

39. The apparatus according to claim 34, further comprising a battery inside the physical barrier, the battery being connected to the generator control unit for supplying power to the generator control unit when the generator is not operating.

* * * * *